United States Patent [19]

Dannert et al.

[11] 3,899,181

[45] Aug. 12, 1975

[54] PLAYBACK METHOD AND SYSTEM

[75] Inventors: Dietmar Dannert; Rainer Ihlenburg; Dietrich Nackmayr; Rudolf Goetze; Wolfgang Kruger; Hartmut Peter; Klaus Westphal; Hans-Joachim Thuy, all of Berlin, Germany

[73] Assignee: TED Bildplatten Aktiengesellschaft, Zug, Switzerland

[22] Filed: May 28, 1974

[21] Appl. No.: 474,448

Related U.S. Application Data

[62] Division of Ser. No. 284,173, Aug. 28, 1972, abandoned.

[30] Foreign Application Priority Data

Aug. 26, 1971 Germany .......................... 2143382

[52] U.S. Cl. .................... 274/1 R; 271/3; 274/9 B; 274/42 R; 360/133

[51] Int. Cl. .................... G11b 17/04; G11b 17/26

[58] Field of Search .............. 274/1 R, 9 B, 42 R; 206/309, 312; 360/133; 271/2, 3

[56] References Cited

UNITED STATES PATENTS

| | | | |
|---|---|---|---|
| 2,480,416 | 8/1949 | Moyes | 206/62 P |
| 2,555,594 | 6/1951 | Markovitz | 274/42 |
| 3,609,722 | 9/1971 | Zenzefilis | 360/97 |
| 3,815,150 | 6/1974 | Stoddard | 360/133 |
| 3,823,948 | 7/1974 | Jenkins | 274/9 B |
| 3,836,731 | 9/1974 | Wilisch et al. | 360/99 |

*Primary Examiner*—Richard E. Aegerter
*Assistant Examiner*—Steven L. Stephan
*Attorney, Agent, or Firm*—Spencer & Kaye

[57] ABSTRACT

An automatic system for the insertion into, and removal from, a playback device of a record carrier normally stored in a protective cover, by transporting the protective cover to a playback surface of the playback device in such a manner that the record carrier moves out of the protective cover for playback, centering the record carrier with respect to the playback surface, and opening of the protective cover for reinserting the record carrier therein and removing the protective cover from the playback device.

The protective cover includes a top and bottom wall and is open along one edge for the introduction and removal of a record carrier and is provided with a recess in one of the walls for the passage of record carrier supporting structure. The recess terminates at the open edge of the cover. Portions of the walls are flexible such that when the walls are oriented horizontally, the wall portions adjacent the open edge are displaced into an open position at least at their center portion due to gravity forces acting on the lower wall when the adjacent part of the upper wall is supported.

20 Claims, 10 Drawing Figures

PLAYBACK METHOD AND SYSTEM

CROSS REFERENCE TO RELATED APPLICATION

This is a division of copending Application Ser. No. 284,173, filed Aug. 28, 1972, and now abandoned.

BACKGROUND OF THE INVENTION

The present invention relates to a playback system for a disc-shaped record carrier foil, and particularly to a protective cover and a method of apparatus for inserting the record carrier into and removing it from a playback device.

A record carrier in this connection is understood to mean an object such as video discs on whose surface information is stored according to a known method.

To play back a record carrier which, due to its material or surface characteristics, is sensitive to manual or mechanical contact overall or part of its surface, such as for example, a record carrier produced in accordance with the teaching of German Pat. No. 1,574,489, and U.S. Pat. No. 3,652,809, it is necessary to protect the sensitive areas of the record carrier from the contact by the hands of the operating personnel or with mechanical elements when the record carrier is inserted into or removed from the playback device. The protection is here to be realized by a protective cover or a protective jacket which may be designed so that the record carrier may also be stored therein.

It is known to store phonograph records in protective jackets and to remove them from the protective jacket in order to be able to place them manually onto the turntable or record changer when they are to be played, and to manually return them into the protective jacket after playing.

A drawback of this procedure is that the manual removal of a record carrier from the protective jacket requires special skill on the part of the operator in order to avoid contacting the record grooves with his fingers.

With foil-shaped record carriers, which are preferred for audiovisual information carriers, these difficulties in maintaining the carrier surface clean become particularly pronounced.

SUMMARY OF THE INVENTION

It is, therefore, an object of the present invention to provide a protective cover for a disc-shaped, particularly a flexible foil record carrier which can be inserted into a playback device with the record carrier contained therein and without manually removing the carrier from its protective jacket. The insertion is to occur without placing any special demands on the skill of the operator while insuring that damage or destruction of the record carrier during insertion into or removal from the playback device is avoided.

It is another object of the present invention to provide a corresponding method for inserting and removing the record carrier accommodated in such a protective cover in a playback device.

It is a further object of the present invention to provide a device for inserting and removing the record carrier safely.

These and other objects are accomplished according to the present invention by transporting a protective cover containing the record carrier to a playback surface of the playback device and removing the protective cover while maintaining the carrier in place so that the record carrier can be played back. Thereafter, the edges of the protective cover are displaced to form an open position so that the protective cover can be moved to receive therein the record carrier. Finally, the protective cover including the record carrier is removed from the playback device.

In further accordance with the invention, the playback device is equipped with a drive apparatus, means for transporting the protective cover to a playback surface of the playback device in such a manner that the record carrier moves out of the protective cover for playback, means for centering the record carrier with respect to the playback surface, and mechanical means coupled with the drive apparatus and the centering means for effecting an opening of the protective cover for reinserting the record carrier therein and removing the protective cover from the playback device.

The protective cover includes a top and bottom wall and is open along one edge for passage of a record carrier. At least one wall of the cover is provided with a recess for the passage of a support, i.e., holding or transporting, means for the record carrier, which recess extends toward and terminates at the open edge of the protective cover. Portions of the walls are made flexible so that the walls adjacent the open edge of the protective cover which, when the cover is inserted into the playback device, come to lie in an approximately horizontal plane, are spread open at least in their center portion due to gravity forces acting on the lower wall when the upper wall is supported in the area of the open edge.

A particular advantage of the protective cover according to the present invention is that automatic insertion of record carriers can be effected automatically and in an uncomplicated manner in conjunction with a simple mechanical device adapted to the protective cover. This advantage is of particular value when a fully automatic changing of mechanically sensitive record carriers is desired.

It should be understood, however, that the protective cover containing the record carrier can also be manually handled according to the present invention with speed and safety without any particular attention on the part of an operator.

In one advantageous embodiment of the protective cover according to the present invention, one of the edges of the cover opening extends beyond the other edge so that spreading of the cover walls is facilitated. Advantageously, the edge defined by the cover wall disposed at the top when the record carrier is inserted into the playback device extends beyond the bottom wall edge.

It is moreover favorable, in order to grip the record carrier in the protective cover, for the protective cover to be provided with a recess extending to the location of the center bore of the record carrier for the passage therethrough of a holding or transporting device so that a centering device for the record carrier can simultaneously serve as the holding device permitting removal of the record carrier from the protective cover.

For a simplified production of the protective cover walls, for example from a cardboard material, it is advantageous to connect the walls together at their closed edges wtih an adhesive tape in such a manner that a space is left between the walls at these closed edges. The adhesive tape is advisably free of adhesive in that area which may be contacted by the record carrier when it is inside the protective cover.

A protective cover provided with a recess in only one wall for the passage therethrough of a holding or transporting device may advantageously be provided with a flap for closing the recess. The flap should be able to fold back through an angle of 360°. This flap is preferably movably connected with the opening edge of the protective cover wall which does not have a recess, and is so dimensioned that in the folded-over state it covers the opening edge in the protective cover as well as the recess. The flap may also be fastened to the protective cover by means of a flexible adhesive tape.

A method for inserting the record carrier into or removing it from a playback device by means of the protective cover according to the present invention involves a movement of the record carrier and protective cover in such a manner that the protective cover leaves the record carrier for playback of the record carrier on the playback surface of the playback device and returns to receive the record carrier after suitable mechanical means, for example, open the protective cover by spreading the walls at the open edge thereof, which walls are preferably differently shaped at the open edge. An advantage of this method is that no particular attention on the part of the operator is needed, nor is a complicated transporting mechanism needed to guide the record carrier and its protective cover to and from the playback device. Rather, the spatial alignment of the protective cover containing the record carrier and the spread of its walls at the open edge is effected automatically by the movement which the protective cover must undergo to insert or remove the record carrier.

Advisably the insertion or removal of the record carrier is effected in that plane in which the record carrier is disposed during the playback process. This results in a compact configuration of the playback device.

In order to play back a plurality of record carriers in succession, possibly without substantial interruption, an advantageous embodiment of the present invention provides that successive record carriers, each in its own cover, may be transported in turn into the plane of a depositing area by means of a magazine. Each one of a plurality of record carriers disposed in such a magazine is made available for playback by appropriate positioning of the magazine to bring each compartment thereof into a predetermined position, each magazine compartment presenting a portion of the above-mentioned depositing surface.

In one advantageous embodiment of the method according to the present invention, the protective cover is guided by mechanical means in a horizontal and vertical direction, during insertion into the playback device, so that the record carrier reaches a given position, which is approximately parallel to the surface on which it will be supported during playback, and the cover is stopped by abutments. When the given position is reached, a holding device is actuated and grips the record carrier at an area of its surface and holds it in the playback position. Subsequent thereto, the protective cover is pulled out of the playback device. Then, after playback of the record carrier is completed, its removal in the protective cover is effected by reinserting the protective cover into the playback device, pulling it around the record carrier disposed in its playback position and releasing the holding device when the protective cover with the record carrier therein is removed from the playback device.

An advantage of this method is that the record carrier itself need not be engaged directly by the transporting means since it is contained in the protective cover and is placed into the playback position together with its protective cover. Thus, the risk of damage of sensitive parts of its surface by mechanical transporting elements is substantially reduced.

Actuation of the holding device is advisably effected by a sensor which is influenced to the extent necessary for the performance of the above variation of the method of the invention by the record carrier and/or the protective cover when the protective cover encloses the record carrier and the two are in the given position.

To prevent operating errors it is advisable for the holding device to be actuated by the sensor only when the release function has been initiated by a control or operating element in the playback device. Consequently the holding device is released when the following conditions are met: the recording carrier is in the playback position; the holding device is actuated; and the release function for the holding device has been initiated by a control or operating element in the playback device.

The mechanical design of a playback device to practice the method of the present invention is simplified by utilizing the protective for alternately effecting an actuation and release of the holding device. That is, when the protective cover with the record carrier disposed therein has reached the given position, which is sufficient to perform the method, the protective cover alternatingly effects and actuation and a release of the holding device. This arrangement affords the possibility for using a bistable mechanical or electronic element. Malfunctions caused, for example, by too rapid a manual back-and-forth movement of the protective cover inside the playback device can advantageously be avoided if the actuation of the holding device by the sensor is initiated only after the expiration of a given time interval between successive actuations of the holding device by the protective cover.

According to another embodiment of the method of the present invention, the protective cover containing the record carrier is placed into a given position where mechanical transporting means press the record carrier against an abutment through a recess in the protective cover. The abutment is preferably constituted by a wall area of the protective cover disposed opposite the recess. Alternatively, the abutment may be constituted by a wall external to the protective cover. The transporting means guides the record carrier out of the protective cover. This is accomplished by reason of the fact that the frictional or adhesive forces which are developed between the pressure point of the transporting means and the record carrier are greater than the frictional or adhesive forces developed between the record carrier and the protective cover whether the protective cover does or does not engage the external abutment. Thereafter the transporting means deposits the record carrier on the playback surface of the playback device. After the playback has been completed to the extent desired, the same transporting means again grips the record carrier, which is still in the playback position and, with the direction of movement reversed compared to the insertion process, the record carrier is removed from the playback device and return into the protective cover.

Although, in this variation of the method, according to the present invention the surface of the record carrier is contacted by the transporting means, the variation constitutes a favorable embodiment since the transporting means are so designed that they will not damage, during transport, the portions of the record carrier surface which bear the recording.

DESCRIPTION OF THE PREFERRED EMBODIMENTS

Figure 1:
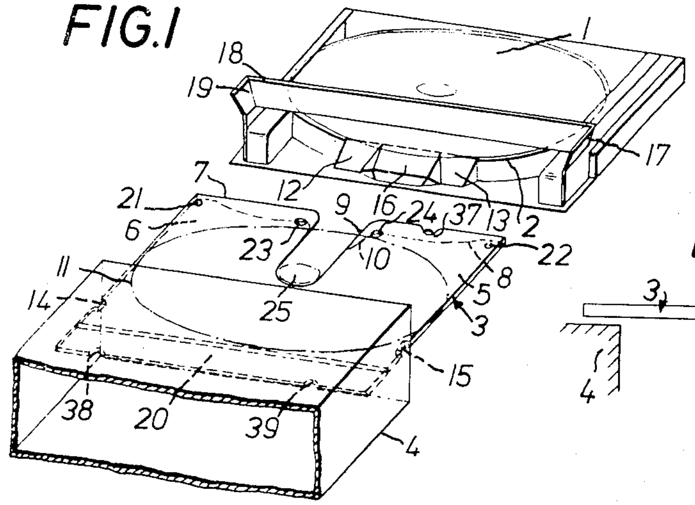
FIG. 1 is a perspective view illustrating one embodiment of a protective cover and playback device according to the present invention with the orientation of the protective cover relative to its magazine storage and the playback device preparatory to insertion of the protective cover and record carrier into the playback device.

In the illustration of FIG. 1, a record carrier 1 is disposed on a stationary playback surface 2 of a playback device, which in the illustrated embodiment is part of a known audiovisual record player or playback device in which a foil-shaped record carrier rotates above the stationary playback surface 2 on a cushion of air. The pickup and drive means for the record player are not shown in the drawing for the sake of clarity. The playback device may include, for example, a carriage which is radially moved over the playback surface and to which the pickup itself is fastened.

There is shown a protective cover 3 within which a record carrier 1 is inserted. The protective cover 3 serves in conjunction with other means to be described more fully hereinafter to insert the record carrier 1 into or remove it from the playback device. The record carrier 1 in its rest position 11 is disposed inside its protective cover 3, and in addition to other record carriers similarly disposed in protective covers, is stacked in a magazine 4.

Figure 8:
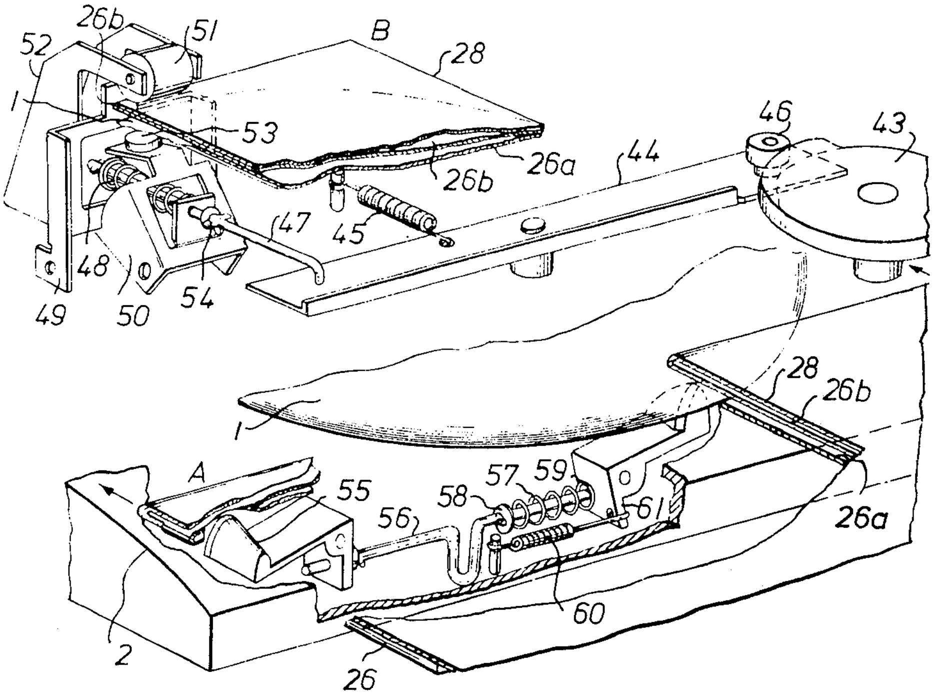
FIG. 8 is a perspective view of one embodiment of a mechanism for the insertion and removal of a record carrier accommodated in its protective cover.
Figure 9:
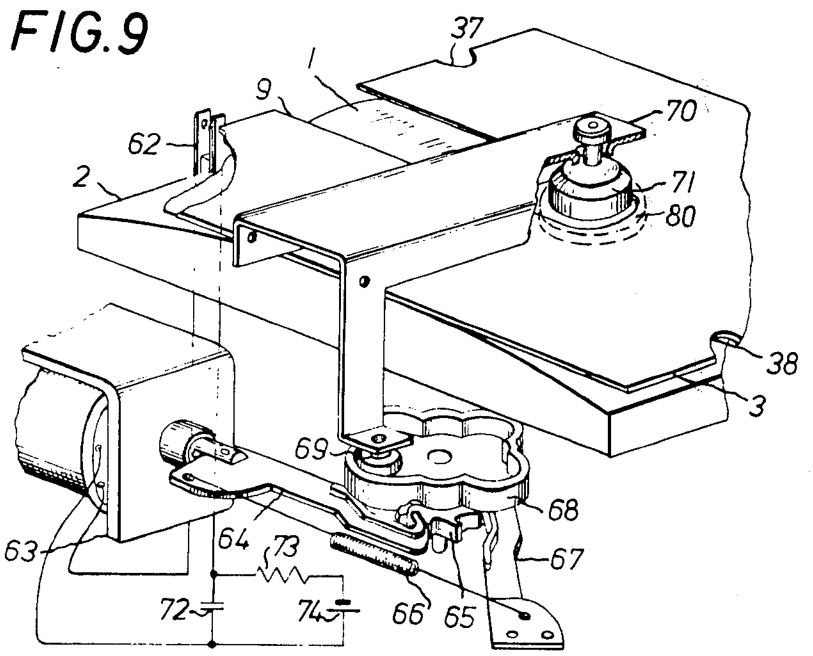
FIG. 9 is a perspective view of another embodiment of a mechanism for the insertion and removal of a record carrier accommodated in its protective cover.

The record carrier 1 can be inserted into the playback device by guiding the protective cover 3 together with the record carrier 1 contained therein until the record carrier 1 is in its playback position as shown in FIG. 1. In its playing position the record carrier is held by suitable holding means so that the protective cover 3 can be moved out of the playback device, away from the playback surface. Details of such a playback device are shown in FIGS. 8 and 9 and are described below.

Removal of the record carrier 1 from the playback device upon completion of the playback is effected in the reverse sequence.

Figure 2:
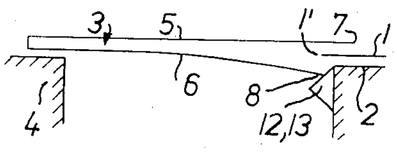
FIG. 2 is a simplified elevational view illustrating a principle of the present invention by which the protective cover is displaced into its spread-open state.

The protective cover 3, according to one embodiment of the present invention illustrated in FIGS. 1 and 2 is provided with an upper wall 5 and lower wall 6 which define the edges 7 and 8, respectively, of the cover opening. At least one of these walls is provided with a recess, or each wall is provided with a recess 9 or 10, respectively. Each recess extends to a corresponding opening edge 7 or 8. The recess or recesses thus defined serve for the passage of a holding or transporting means for the record carrier.

Since the record carrier 1 must again be placed inside the protective cover 3 after playback, the opening edges 7 and 8 of the protective cover 3 can be displaced or spread open because at least individual portions of the walls 5 and 6 are made flexible. This flexibility of the material of the protective cover 3 is so selected that both opening edges 7 and 8 move away from one another when, as shown in FIG. 2, the upper wall 5 is supported in the area of its opening edge 7 and in a further area disposed at the other side of the cover from the opposite open edge, while the forces of gravity act on the lower wall 6. It should be noted that it is immaterial whether the lower wall 6 is lowered relative to upper wall 5 or whether the upper wall 5 is lifted relative to the lower wall 6.

The displacement or spreading of the opening edges 7 and 8 by the mechanical means shown is facilitated by constructing one wall of the protective cover 3 so that it extends beyond the other wall. In the illustrated playback device as shown in FIG. 1, in which the upper wall 5 is supported in the area of its opening edge 7 when the protective cover 3 is inserted into the playback device, the upper wall 5 extends or protrudes beyond the edge 8 of the lower wall 6. The above-mentioned support is effected in a simple manner by placing the protruding portion of the upper wall 5 on supporting points or surfaces. In the preferred embodiment the supporting surface is constituted by a portion of the record carrier 1. It should be understood, however, that the supporting surface can also be constituted by other suitable means.

The insertion of the record carrier 1 into the playback device with the aid of protective cover 3 according to the method of the present invention takes place as follows:

The protective cover 3 together with the record carrier 1 is transported by transporting means, to a given position which is approximately parallel to and approximately corresponds with the playback position of the record carrier. From the given position, abutments and guide means take over guidance of the protective cover 3 in the vertical or horizontal direction, so that automatic insertion of the record carrier 1 into the playback device is effected.

The record carrier 1 is then held in its playback position shown in FIG. 1 with the aid of means to be described hereinafter while the protective cover 3 is retracted or removed from the playback device.

An important factor for the operational efficiency of the above-mentioned method, is the way in which the record carrier 1 is returned into the protective cover 3 upon completion of the playback process.

In the playback device according to FIG. 1 the empty protective cover 3 is moved toward the playback surface 2 until the protruding area of the upper wall 5 comes to rest on the record carrier 1 as shown in FIG. 2. In conjunction therewith and as a result of the flexibility of the protective cover 3 and the gravity forces acting on the lower wall 6, a portion of the lower wall 6 sags downwardly so that the opening edges 7 and 8 are displaced or spread open. The sagging portion of the lower wall 6 is lifted by means of guides 12 and 13 provided in the playback device as the protective cover 3 is pulled completely over the record carrier 1. As a result the lower wall 6 comes to lie between the record carrier 1 and the playback surface 2. Subsequently, upon release of a holding device, if it is provided, the protective cover 3 together with the record carrier 1 is removed from the playback surface 2 and returned, for example, to the magazine 4.

The mechanical means for transporting the protective covers 3 as they are required from the magazine 4, engage in recesses 14 and 15 provided in the sides of the protective cover 3.

Figures 6, 10:
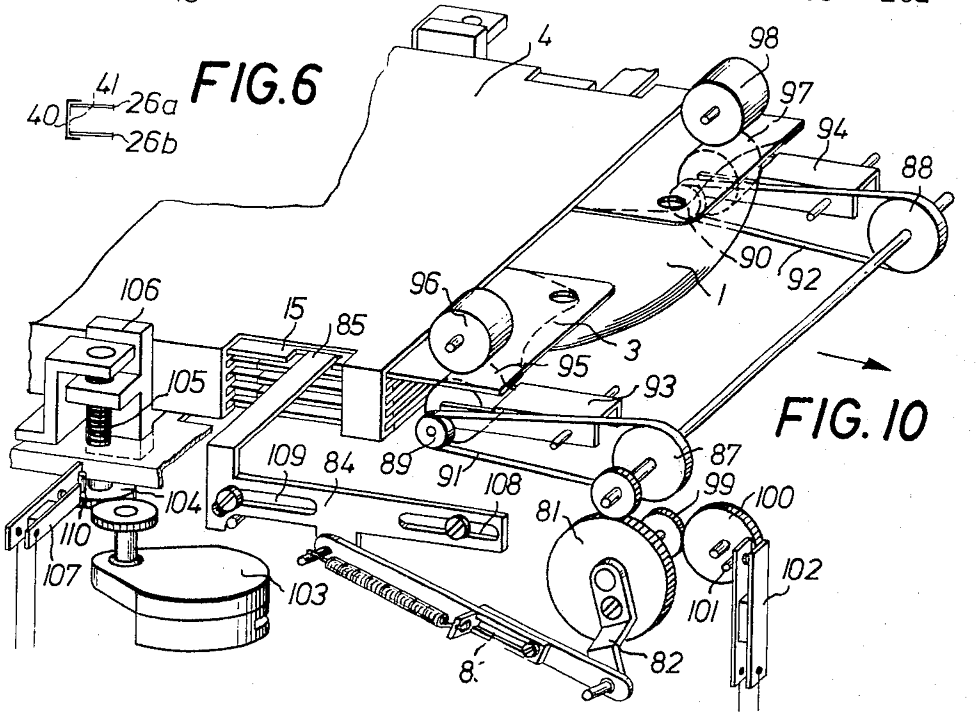
FIG. 10 is a perspective view of an embodiment of mechanisms for raising and lowering the magazine of FIG. 1 and for transporting the protective covers containing the record carriers from the magazine to the playback device.

Details of an embodiment of mechanisms for raising and lowering the magazine and for transporting the protective covers containing the record carriers form the magazine to the playback device are shown in FIG. 10 and will be described subsequently.

To facilitate inserting the protective cover 3 into the playback device, particularly when this is done manually , the playback device is provided with guide surfaces 17, 18, and 19 which are tapered to form a funnel. These guide surfaces are arranged in such a manner that the protective cover 3 which has been inserted into the playback device can be reached by the fingers of the operator for manual insertion of the record carrier 1 into the playback device. For this purpose only the area of trailing edge strip 20 of the protective cover 3, which is not occupied by the record carrier 1 in its rest Position 11 is availabe to be grasped for manual insertion. The trailing edge 20 forms a closed portion of the protective cover 3 which is outside of the rest position 11.  moving the opening edges 7, 8 of the empty protective cover 3 in a downwards direction from a position above the playback surface 2.

The surface 16 of the playback device is supposed to guide the protective cover 3 containing the record carrier 1 to the playback surface 2 by lifting it, when this is inserted from a position slightly below the the playback surface 2 when inserting the record carrier 1 into the playback device.

Thus it is assured that the record carrier 1 will be in position for playback and not remain in the protective cover 3 even if, for example, the walls 5 and 6 are rapidly pressed together manually in the area of the record carrier trailing edge which is disposed opposite the opening edges 7 and 8. Moreover, mechanical damage of pressure-sensitive surface portions of the record carrier 1 by the hands of the operating personnel during insertion and removal is effectively eliminated.

The reinsertion of the record carrier 1 into the protective cover 3 is to take place in a manner which is as unimpeded as possible. For this purpose the opening edges 7 and 8 of the protective cover 3 are so designed that they will not come in parallel contact with any portion of the leading edge 1' of the record carrier 1. The angle of the tangents to the points of contact on the record carrier 1 in the protective cover opening is selected to be as large as possible.

In addition, the protective cover 3 is provided with raised portions 21 and 22 on the inner surface of either or both the walls 5 and 6 and in the vicinity of its opening. The raised portions 21 and 22 keep the opening edges 7 and 8 of the protective cover 3 at a distance from one another even at their outer ends in order to facilitate reinsertion of the record carrier 1. The raised portions 21 and 22 are also disposed in the protective cover 3 at points outside the rest position 11 of the record carrier 1 in order to prevent deformation of the pressure-sensitive record carrier 1 in the protective cover 3 when mechanical stress is placed on the cover, for example by heavy objects placed on the cover.

Recesses 23 and 24 are disposed in the upper wall 5 of the protective cover 3 facing the operator's eye during the reinsertion of the protective cover 3 into the playback device. The recesses 23 and 24 are disposed in the vicinity of the opening edges 7 and 8 and over portions of the inner surface of the oppositely disposed lower wall 6 to permit visual control during manual reinsertion of the record carrier 1 into the protective cover 3. The portions of the inner surface of the oppositely disposed lower wall 6 exposed by these recesses are different in color from the color of the record carrier 1 and the color of the outer surface of the upper wall 5 surrounding the recesses 23 and 24 which faces the eyes of the operator and surrounding the recesses. With this aid, it is possible to detect, in a simple manner, whether the record carrier 1 has been properly reinserted into the protective cover 3 between the walls 5 and 6, or whether a portion of the record carrier 1 has gotton into an area outside the protective cover 3 due to some malfunction. If this portion of the record carrier 1 which is not covered by the protective cover 3 is disposed above the protective cover 3, the operator will be able to see it directly, whereas if a portion is disposed below the protective cover 3 this state is indicated to the operator in that the record carrier 1 cannot be seen through at least one of the recesses 23 and 24. This is a sign for the operator that the protective cover 3 must be retracted and reinserted after possible correction of its guidance.

A further possibility (not shown) for visual control of the reinsertion of the record carrier 1 into the protective cover 3 for removal of the record carrier 1 from the playback device involves making portions of the cover surface of the protective cover facing the eye of the operator are made of a transparent material. The resulting effect is the same as that achieved with the recesses 23 and 24.

The recesses 9 and 10 in the protective cover 3 which are provided for the passage of the holding or transporting means include an area of the two walls 5 and 6 of the protective cover 3. The recesses 9 and 10 extend sufficiently inwardly from the edges 7 and 8 to expose the center hole 25 of the record carrier 1 when the record carrier is in its rest position 11. In this way it is possible to permit the record carrier 1 to be gripped by a holding device engaging its center hold 25 when it has been placed into the playback position, the holding device simultaneously serving to center and drive the record carrier 1 during the playback process.

Advantageous designs for other possible embodiments of the protective cover according to the present invention are shown in FIGS. 3 to 7. The embodiment of a protective cover 26 shown in FIG. 3 has a recess 27 for the passage of a holding or transporting means in only one of its cover walls 26*a*. The opening edge of recess 27 in this protective cover 26 is also so designed as are the leading edges of the protective cover 3, that contact between the opening edge and the leading edge of the record carrier 1 which would impede the insertion of the record carrier 1 into the protective cover 26 is prevented.

The illustrated embodiment of the protective cover 26 is further distinguished by the provision of a flap 28 which is movably connected with the lower wall 26*b*, which does not have recesses therein. In the closed state the flap 28 covers the recess 27 in the upper wall 27*a* in order to protect the record carrier 1 from contact and soiling.

Figure 3:
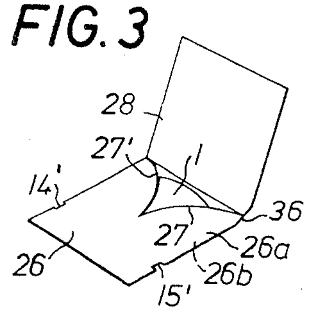
FIGS. 3 to 7 illustrate details of various embodiments of the protective cover according to the present invention.
Figure 4:
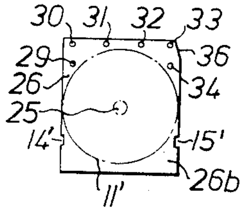
Figure 5:
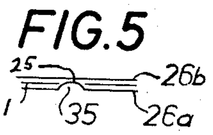

FIG. 4 shows in what way outwardly directed raised portions 29 to 34 may be arranged along the inside surface of the lower wall 26*b* in the vicinity of the opening edge 27' (FIG. 4) in order to keep the opening edges at a distance from one another to further facilitate the reinsertion of the record carrier 1 into the protective cover 26. The raised portions 29 to 34 are arranged outside of the rest position 11' of the record carrier 1 in the protective cover 26 as shown by the dashed lines and are also provided to prevent the record carrier 1 from falling out of the protective cover 26 during storage and transport in the protective cover 26. A raised portion 35 may be disposed in a corresponding manner in the upper wall 26*a* in the area of the center hole 25 of the record carrier 1 when it is in its rest position, as is shown in FIG. 5. The raised portion 35 engages in the center hole 25 for aiding in securing the record carrier 1 in the protective cover 26. In order to prevent insertion of the protective cover 26 into the playback device or into a magazine with its sides reversed, care is taken in the rectangularly shaped embodiment of the protective cover 26, as shown in FIGS. 3 and 4, that the length of the longitudinal edge exceeds the length of the transverse edge by such an amount that the protective cover 26 can no longer be inserted with the longitudinal edge foremost into an opening corresponding to the length of the transverse edge.

The protective cover 26 is provided with a recess 36 as shown in FIGS. 3 and 4, while the protective cover 3 is provided with recesses 37–39 as shown in FIG. 1. These recesses serve to prevent malfunctions. They constitute mechanical codes which initiate predetermined functions in the playback device or prevent the complete insertion of the protective cover into the playback device or magazine. It should be understood that any number and arrangement of recesses in any embodiment of the protective covers as desired is possible. The above-mentioned predetermined functions that can be initiated by the mechanical codes may be, for example, electrical functions such as the switching on or off of electrical drives or transmission channels as well as special locking functions such as, for example, the prevention of the lowering of the pickup of the playback device when the record carrier has not been inserted completely into the playback device or when the protective cover is still disposed on the playback surface.

In order to prevent jamming of the record carrier 1 in the area of the connecting edges of the walls 26*a* and 26*b* of the protective cover 26, the walls 26*a* and 26*b* are connected together along their closed edges by means of an adhesive tape 40 in such a manner that a space between the walls 26*a* and 26*b* remains. The area which may be contacted by the record carrier 1 disposed in the protective cover 26 is free of adhesive in an area 41 so that the record carrier 1 will not stick to the adhesive tape 40 in this area.

Figure 7:
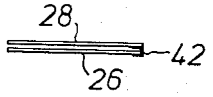

In order to facilitate manual opening of the protective cover 26 and to increase the mobility of the flap 28, the flap is fastened to the protective cover 26 by means of a flexible adhesive tape 42 as shown in FIG. 7.

FIG. 8 shows the mechanism utilized during the insertion of the record carrier 1 in the protective cover 26 into the playback device according to one embodiment of the present invention. Only the playback or depositing surface 2 of the playback device as well as the mechanical switching means utilized during the insertion of the protective cover 26 are shown in the perspective representation. The position which the record carrier 1 must assume on the playback surface 2 during playback is likewise indicated.

For this purpose it is clear from a comparison of FIGS. 3 and 8 that the flap 28 is rotated into engagement with the outside surface of the lower wall 26*b* and that the protective cover 28 will be inserted into the playback device with the outer surface of the upper wall 26*a* facing the playback surface 2.

The protective cover 26 containing the record carrier 1 is inserted horizontally in the playback device in the direction of the two arrows so that the protective cover is initially in position A. Upon further insertion in the horizontal direction, the protective cover then reaches the position B. Both positions are shown in FIG. 8, however, the protective cover 26 is shown partially cut away in each time so that the switching members disposed therebelow can be seen.

When the record carrier 1 is inserted, the control wheel 43 of the playback device is disposed in the illustrated position. A lever 50 is pretensioned via a rod 47 by a compression spring 48 in conjunction with a guide lever 44, which is kept in constant contact with the control wheel 43 by a tension spring 45 and a roller 46. The lever 50 is arrested by a latch 49 from being pivoted by the spring 48 toward a roller 51 of an abutment 52.

The latch 49 itself is held in its position, for example, by a tension spring (not shown). The protective cover 26 is guided, shortly before it reaches position B, by the roller of the abutment 52. When the protective cover 26 has reached position B, the record carrier 1 reaches the position required for the playback process. As soon as the protective cover 26 has released the lever 50 by abutting against the latch 49, the lever 50 passes through a recess in the protective cover 26 and presses with a coating 53 of its contact surface against the underside of the record carrier 1. Contact is effected in an area of the record carrier surface which does not contain any portion of the recording. The record carrier 1 is then pressed in turn against the inside surface of the upper wall 26*b* of the protective cover 26, which itself is in abutment against the roller 51. If not the protective cover 26 is pulled out manually or by mechanical means from the playback device (in the drawing in a direction opposite the direction of the arrows), the record carrier 1 remains in the playback plane of the playback device since the friction forces between the coating 53 and the record carrier are greater than the friction forces between the protective cover 26 and the record carrier 1. Before the onset of the playback process the control wheel 43 is rotated into a position by a suitable control or by operating elements in the playback device to where the guide lever 44 is sufficiently released so that the compression spring 48 is relaxed up to the abutment 54 and the coating 53 releases the record carrier 1.

In order to remove the record carrier 1 from the playback plane, the protective cover 26 is again inserted — in the direction of the arrows — into the playback device. During insertion the pivotally mounted sensor lever 55 is depressed by the protective cover 26 and actuates, via a push rod 56 and a compression spring 57, which is limited in its expanse by the abutments 58 and 59, a rocker arm 61, which has been biased by a tension spring 60. The rocker arm 61 includes a wedge-shaped pressure surface which is moved upwardly by the actuation of the rocker arm through a recess in the playback surface and presses against an insensitive area of the bottom of the record carrier 1 disposed in its playback position with respect to the surface 2. As a result the record carrier 1 is moved upwardly and itself lifts the wall **26*b* which protrudes beyond the wall 26*a* with the effect that the opening in the protective cover 26 is displaced into an open position due to the flexibility of the protective cover 26 and the gravity forces acting on the lower wall 26*a*. A possible excess lifting by the sensor lever 55 occurring after a maximum deflection of the rocker lever 61 is absorbed by the compression spring 57. During the further advancing of the protective cover 26 toward the left, the lower wall 26*a* passes below the record carrier 1** and the later is again moved into the protective cover.

If a foil-shaped record carrier which during playback does not rotate on a turnable but on a cushion of air over the playback surface should adhere to the playback surface due to electrostatic charges, the record carrier would be continuously loosened according to the illustrated method from the playback surface 2 in an advantageous manner without any mechanical stress by the rocker arm 61 and the opening edge of the lower wall **26*a* in succession. To simplify the control, however, the rocker lever 61** is also actuated when the record carrier is inserted into the playback device without this having any influence on the sequence of the process.

In the embodiment according to FIG. 9, the record carrier 1 within its protective cover 3 is inserted from the right toward the playback surface 2 of a playback device, which is not completely illustrated. In the illustrated position the protective cover 3 actuates an electrical contact 62. The recesses 37, 38 and 39 (39 is shown only in FIG. 1) prevent actuation of the contact 62 when the protective cover 3 is inserted with its sides reversed or in the wrong direction. The contact 62 actuates an electromagnet 63 which attracts a pawl 64. The latter engages a sprocket wheel 65 which is advanced by one step per actuation of the magnet. When the magnet is not actuated, the pawl 64 is retracted to a starting position by a tension spring 66 and at the same time a block 67 is brought into engagement with the sprocket wheel 65 so that the sprocket wheel 65 is fixed in its position. The effect of the block 67 is overcome by the force of the electromagnet 63 when the sprocket wheel 65 is actuated by the pawl 64. A cam member 68 is mechanically connected with the sprocket wheel 65. The peripheral shape of the cam member 68 is such as to influence the movement of a lever 70 via a roller 69. A rotatably mounted contact element 71 is disposed at the end of the lever 70. During each actuation of the electromagnet 63, the contact element 71 is alternatingly raised and lowered. In order to prevent double actuation, the electromagnet 63 is operated by an electric load constituted by a capacitor 72, which itself is charged via a resistor 73 from a voltage source 74. Because of the resulting charging time constant of the capacitor 72 repeated actuation of the electromagnet 63 is possible only after the expiration of a given time interval. During the insertion of the record carrier 1, the rotatably mounted contact element 71 which had been raised when the record carrier was inserted while still in its protective cover 3, is lowered upon actuation of the electrical contact 62 and retains the record carrier 1. The rotatably mounted contact element 71 engages with a centering cone (not shown in FIG. 9), in the center hole 25 of the record carrier 1 and thus fixes the record carrier 1 in its precise playback position. If now the protective cover 3 is retracted from the playback surface of the playback device, the record carrier 1 remains in the playback position.

In order to drive the record carrier 1 during the playback process, the rotatably mounted contact element 71 produces a force-transmitting connection with a central follower device for driving the record carrier 1. This effect can be augmented by the use of a magnetic coupling between the follower device and the contact element 71.

The record carrier 1 is removed from the playback device in a manner analogous to the device shown in FIG. 8 in that the protective cover 3 is pushed over the record carrier 1 disposed in the playback plane while it is being spread open in a manner according to the present invention. If the contact 62 is now actuated by the protective cover 3, the contact element 71 is raised and releases the record carrier 1 which can then be removed from the playback device while contained within its protective cover 3.

FIG. 10 shows a mechanism for transporting the protective cover 3 containing the record carrier 1 from the magazine 4 to any one of the playback devices shown in FIGS. 7, 8 and 9 and also a mechanism for raising and lowering the magazine.

When the gear wheel 81 is driven in a counterclockwise direction the protective cover 3 is driven partly out of the magazine 4 by means of the crank 82, the resiliently mounted connecting rod 83 and the catch 85 on the horizontally guided lever 84 which engages into the recess 15 of the protective cover 3. A similar arrangement on the opposite side engaging in the recess 14, which is not visible in FIG. 10, has been omitted for the sake of clearness.

Shortly after the protective cover 3 engages in the rollers 95 to 98 the catch 85 is lifted by means of the shaping of the cutout 109 and thus disengaging the recess 15. Now the protective cover 3 is driven in the direction of the arrow towards the playback device which is not shown. To ease the reinserting of the protective cover 3 into the magazine 4 at least part of the trailing edge strip 20 (shown in FIG. 1) remains in the magazine 4.

The rollers 95 – *v*are driven by the gear wheel 81 by means of belts 91, 92 and wheels 87 to 90.

The gear wheel 81 stops after one half turn, and after the holding means of the playback device (not shown) have gripped the record carrier 1 the gear wheel driven in clockwise rotation back to its original position, thus causing the same mechanical means to reinsert the protective cover 3 back into the magazine 4, while the record carrier 1 remains on the playback surface 2.

For the removal of the record carrier 1 from the playback surface 2 the mechanism is actuated once again in the same manner, while the record carrier 1 is being released.

After the protective cover 3 has been reinserted completely into the magazine the pin 101 closes the contact 102, which actuates the motor 103 driving a spindle gearing 105 connected to a magazine support 106 thus rising the magazine until the catch 85 engages into the recess of the next protective cover stored below, when the motor 103 is switched off by means of the pin 101 on the wheel 104 said the contact 107. To assure the actuation of the mechanism for raising the magazine 4 only every second time, the contact 102 may be connected to a known binary divider, which is not shown.

After all the record carrier stored in the magazine 4 have been played back the magazine 4 may be lowered again to be removed by reversing the direction of rotation of motor 103.

The material for an advantageous embodiment of the protective cover is Bristol board of a thickness of approximately 0.2 to 0.3 millimeters and a weight of approximately 190 to 250 g/m$^2$.

It will be understood that the above description of the present invention is susceptible to various modifications, changes and adaptions, and the same are intended to be comprehended within the meaning and range of equivalents of the appended claims.

We claim:

1. A playback device for a disc-shaped record carrier which is inserted into and removed from the playback device while contained within a protective cover, comprising: a drive apparatus; means defining a playback surface; means defining an insert opening to said playback surface; transporting means for sequentially inserting such a protective cover through said insert opening and onto said playback surface, and removing such cover, through said insert opening, from said playback surface; holding means disposed for holding a record carrier on said playback surface after the first such insertion and during the first such removal, for permitting the cover to be withdrawn from the carrier, and for releasing such carrier at least after the second such insertion for permitting the record carrier to be removed from the playback surface together with its associated cover during the second such removal; means for centering the record carrier with respect to the playback surface; and mechanical means disposed in the vicinity of said insert opening for effecting a spreading of the protective cover opening for reinserting the record carrier into the protective cover.

2. A playback device as defined in claim 1, wherein said playback surface is so dimensioned that the edge of the record carrier protrudes beyond the edge of said playback surface at said insert opening of said playback device.

3. A playback device as defined in claim 1, further comprising guide surfaces for raising a lower wall of the protective cover which droops downwardly due to the gravity forces acting thereon when the protective cover is moved into said playback device.

4. A playback device as defined in claim 1, wherein said mechanical means are provided in the area of said insert opening for engaging an opening edge of one wall of the protective cover which protrudes beyond the opening edge of an associated wall of the protective cover and effecting the spreading of the protective cover opening.

5. A playback device as defined in claim 1, further comprising funnel-type oblique guide surfaces adjacent said insert opening of said playback device to facilitate insertion of the protective cover.

6. A playback device as defined in claim 1, further comprising: a magazine containing the record carriers in their protective covers; and a transporting device for said magazine which moves said magazine in a direction perpendicular to the walls of the protective covers when the protective covers containing the record carriers are stacked in the magazine in such a manner that the walls are adjacent to one another.

7. A playback device as defined in claim 6 wherein said transporting means are provided for transporting the protective covers containing the record carriers from the magazine to the playback device and vice versa.

8. A playback device as defined in claim 1, further comprising a block which permits the complete insertion of the protective cover into said playback device only when the edge of the protective cover which is inserted as a leading edge contains an appropriate mechanical coding.

9. A playback device as defined in claim 8, further comprising a sensing element which is so arranged that it is actuated by the edge of the protective cover provided with the mechanical coding only when the protective cover is inserted into the playback device in a predetermined position.

10. A playback device as defined in claim 1, wherein said holding means includes a pivotally mounted lever provided with a contact surface and an abutment, said lever being mounted to press the record carrier against said abutment with its contact surface when said holding device is actuated, so that a force-transmitting connection is established between the record carrier and said holding means, with the friction forces between said contact surface and the record carrier being greater than the friction forces between the protective cover and the record carrier.

11. A playback device as defined in claim 10, wherein the contact surface presses the record carrier against an inner surface of one wall of the protective cover and the upper surface of this wall against said abutment so that a force-transmitting connection is established between the record carrier protective cover and said holding means, with the friction forces between said contact surface and the record carrier being greater than the friction forces between the protective cover and said abutment and between the protective cover and the record carrier.

12. A playback device as defined in claim 10, wherein said contact surface is provided with a coating of an elastic material having a high coefficient of friction.

13. A playback device as defined in claim 10, wherein said abutment comprises a rotatably mounted roller.

14. A playback device as defined in claim 10, further comprising: spring means for biasing said lever toward said abutment; a control wheel in the form of a cam; and a latch which arrests said lever against the bias force produced by said spring means, said latch being so arranged that it releases said lever as soon as the record carrier has reached the playback position and the protective cover engages said latch and causes it to be displaced by a given amount.

15. A playback device as defined in claim 10, further comprising: spring means for biasing said lever toward said abutment; a control wheel in the form of a cam; and a latch which arrests said lever against the bias force produced by said spring means, said latch being so arranged that it releases said lever as soon as the record carrier has reached the playback position and the record carrier engages said latch and causes it to be displaced by a given amount.

16. A playback device as defined in claim 10, further comprising: spring means for biasing said lever toward said abutment; a control wheel in the form of a cam; and a latch which arrests said lever against the bias force produced by said spring means, said latch being so arranged that it releases said lever as soon as the record carrier has reached the playback position and the protective cover and record carrier engage said latch and cause it to be displaced by a given amount.

17. A playback device as defined in claim 1, wherein said holding means includes a rotatably mounted pressure element and a centrally disposed follower device, and wherein the pressure element presses the vicinity of the center portion of the record carrier, which is in the playback position, against said centrally disposed follower device in order to produce a force-transmitting connection, said follower device simultaneously serving to center the record carrier for the playback process and drive the record carrier during the playback process.

18. A playback device as defined in claim 17, wherein said means for producing a force-transmitting connection further includes a magnet armature.

19. A playback device as defined in claim 17, further comprising: an electrical switch sensing element; a lifting magnet which is actuated by said switch; and a control cam which is turned by said magnet in stepwise movements for actuating said holding means, said control cam being so designed that with each stepwise movement said holding means is alternatingly actuated and released.

20. A playback device as defined in claim 19, further comprising: a capacitor which feeds said lifting magnet and which is connected to a voltage source via a resistor, wherein the combination of said resistor and said capacitor is so dimensioned that said capacitor is sufficiently charged only after a predetermined period of time, for actuating the operation of said lifting magnet.

* * * * *

UNITED STATES PATENT OFFICE
CERTIFICATE OF CORRECTION

Patent No. 3,899,181 Dated August 12, 1975

Inventor(s) Dietmar Dannert et al.

It is certified that error appears in the above-identified patent and that said Letters Patent are hereby corrected as shown below:

On the Cover Sheet, item [73] should read as follows:

-- TED Bildplatten Aktiengesellschaft AEG-TELEFUNKEN.TELDEC, Zug, Switzerland --.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*